United States Patent [19]
Joachim et al.

[11] Patent Number: 5,598,911
[45] Date of Patent: Feb. 4, 1997

[54] HYDRAULIC SLIDER COUPLING

[75] Inventors: Clifford A. Joachim, Baulkham Hills; Stanislaw Spryszynski, Kingswood, both of Australia

[73] Assignee: BTR Engineering (Australia) Limited, Fairfield, Australia

[21] Appl. No.: 146,147

[22] PCT Filed: May 7, 1992

[86] PCT No.: PCT/AU92/00209

§ 371 Date: Dec. 16, 1993

§ 102(e) Date: Dec. 16, 1993

[87] PCT Pub. No.: WO92/19881

PCT Pub. Date: Nov. 12, 1992

[30] Foreign Application Priority Data

May 8, 1991 [AU] Australia .................. PK 6040

[51] Int. Cl.$^6$ ................................ F16D 25/06
[52] U.S. Cl. .................. 192/59; 188/316; 188/317; 464/24
[58] Field of Search ............. 192/57, 59; 188/311, 188/316, 317; 464/24

[56] References Cited

U.S. PATENT DOCUMENTS

| | | | |
|---|---|---|---|
| 2,118,808 | 5/1938 | Corbin, Jr. .................. | 192/59 X |
| 3,319,754 | 5/1967 | Kokochak et al. .............. | 192/57 |
| 4,889,206 | 12/1989 | Wiese et al. ................. | 180/248 |
| 5,103,642 | 4/1992 | Suzuki et al. ................ | 192/59 X |

FOREIGN PATENT DOCUMENTS

| | | | |
|---|---|---|---|
| 974603 | 2/1951 | France . | |
| 801421 | 7/1949 | Germany . | |
| 3408977 | 9/1985 | Germany . | |
| 3532745 | 4/1986 | Germany . | |
| 405429 | 2/1934 | United Kingdom ......... | 192/59 |
| 1333878 | 10/1973 | United Kingdom . | |

OTHER PUBLICATIONS

Abstract, "Vehicle friction coupling system—has higher transmission capacity in forward than in reverse direction," Viscodrive GmbH Nov. 8, 1987—DE–726641.

SAE paper entitled, "SAE Exhibition, Featured Japanese Auto Technologies and Products from SAE—Part I," dated Apr. 19, 1990, p. 24, with one page drawing of Fuji/Nissan differential (description in Italian, date unknown).

Reg Technologies Inc. press release, entitled "Re: Rand Cam/Direct Charge Engine," dated Jul. 26, 1993, 5 pages.

SAE Technical Paper Series No. 920611, entitled "Viscous Couplings in 4WD Vehicles: Application of Computational Modelling," International Congress & Exposition, Detroit, Michigan, Feb. 24–28, 1992, pp. 37–46.

(List continued on next page.)

Primary Examiner—Andrea L. Pitts
Attorney, Agent, or Firm—Marshall, O'Toole, Gerstein, Murray & Borun

[57] ABSTRACT

A hydraulic ball coupling assembly (1) comprises an inner hub (2) and an outer hub (3) disposed for relative coaxial rotational engagement. The inner hub (2) includes a continuous sinuate recessed track (4) extending circumferentially around the cylindrical outer surface (5). The outer hub (3) includes a plurality of uniformly spaced axially extending grooves (6) on the inner cylindrical surface (7). The grooves (6) extend in a direction substantially normal to the general effective direction of the sinuate track (4). A slider (10) is reciprocally disposed within each groove (6) and located in the intersecting region (11) of the sinuate track (4) and the respective groove (6) such that relative rotation of the inner and outer hubs (2, 3) causes each slider (10) to oscillate axially within its respective groove (6) while traversing the track (4). The grooves (6) and track (4) contain a hydraulic fluid of suitable viscosity to provide fluid resistance to the oscillation of the sliders (10) and thereby permit transmission of torque between the inner and outer hubs (2, 3).

15 Claims, 8 Drawing Sheets

OTHER PUBLICATIONS

JSAE paper, entitled "New Technologies & New Cars, Hydraulic Coupling Unit (HCU) for Full-Time 4WD Vehicles," JSAE Review, vol. 11, No. 4, Oct. 1990, pp. 100–105.

IMechE paper No. C377/88, entitled "Application of viscous couplings for traction control in passenger cars," IMechE 1988 C277/88, pp. 151–161.

SAE International SP–854, entitled "Automotive Transmission Advancements, Development of a Rotary Tri–Blade Coupling for Four–Wheel Drive Cars," No. 910806, pp. 157–163 (date unknown).

Japan Autotech Report article, entitled "Drivetrain, Mitsubishi Hydraulic Coupling Unit," May 1989, pp. 17–23.

HYDRAULIC SLIDER COUPLING

TECHNICAL FIELD

The present invention relates to variable torque-speed transmission couplings and in particular to a hydraulic slider coupling.

The invention has been developed primarily for use in automotive applications and will be described with reference to this application, However, it will be appreciated that the invention is not limited to this particular field of use.

BACKGROUND ART

A viscous coupling is a torque transmitting element which functions by means of viscous friction whereby the torque-speed characteristic is dependent upon the rheological properties of the viscous filling medium which is usually a silicone based fluid.

In the past, viscous couplings have usually comprised sets of mutually interleaved parallel annular plates coaxially mounted for rotation within an hermetically sealed enclosure containing a viscous medium in contact with adjacent surfaces of the plates. Alternate plates are connected with respective driving and driven elements such that an angular velocity differential across the coupling causes viscous shearing of the fluid in the annular clearance between adjacent plates to produce the desired speed-torque transmission characteristic. Commonly used silicon based fluids in viscous couplings exhibit a degressive torque response with increasing rate of shear.

It is also known to provide means whereby the plates can be urged into frictional engagement under predetermined operating conditions to increase torque transmission and to provide a series of radially spaced perforations in the plates to permit predetermined variation of the torque transmission characteristics of the coupling to suit particular applications.

However, these viscous couplings of the prior art are relatively slow to transfer torque and do not provide great design flexibility, particularly in applications requiring the transmission of large torques. Furthermore, known viscous couplings are usually highly sensitive to variations in operating conditions such as temperature and fluid viscosity and pressure.

DISCLOSURE OF THE INVENTION

It is an object of the present invention to provide a relatively simple and compact coupling which ameliorates the abovementioned disadvantages of the prior art, or at least provides an alternative to known viscous couplings.

According to a first aspect, the invention consists in a coupling assembly comprising a first member and a second member disposed for relative rotational engagement, one of said first and said second members including a circumferentially extending continuous and generally sinuate track, the other of said first and said second members including at least one transverse track extending in a direction substantially normal to the general direction of the sinuate track, a slider located in an intersecting region of said sinuate and transverse tracks such that relative rotation of said first and said second members causes said slider to oscillate axially within said transverse track while traversing said sinuate track, and a hydraulic fluid medium within said transverse track to provide a resistance to said oscillation of said slider.

Preferably the first member is an inner hub including the sinuate track on an outer cylindrical surface thereof and the second member is a complementary outer hub supported for coaxial rotation with respect to the inner hub and defining a plurality of uniformly spaced axially extending transverse tracks in the form of grooves on an inner cylindrical surface thereof, the inner hub being mounted for relative rotation substantially within the outer hub.

Preferably, the sinuate track is periodic and in one form of the invention the track is sinusoidal.

In a first preferred form of the invention, the slider is in the form of a ball and the track and grooves are substantially semicircular in cross section.

However, in an alternative form of the invention each ball engages a prismatic slider for reciprocation within a complementary prismatic groove or bore. The prismatic grooves are preferably rectangular in cross section.

In a further preferred form of the invention a clearance is provided between each groove and associated slider through which the hydraulic fluid is throttled during reciprocation of the slider. Alternatively, however, the slider may be in the form of a piston sealingly slidable within the groove and in this case the piston can include an orifice through which the hydraulic fluid is throttled to provide a predetermined resistive damping force.

In an alternative form of the invention, each slider preferably comprises a cylindrical piston sealingly reciprocable within the respective groove and the hydraulic fluid is contained in a closed loop and throttled through a selectively adjustable control valve in response to reciprocation of the piston. This form of the invention permits selective adjustment of the torque transfer characteristic for given differential coupling speeds and permits selection of a lock-up condition between the input and output hubs of the coupling by means of complete closure of the control valve.

In a further alternative form the first member is an inner hub including a plurality of axially extending prismatic sliders angularly spaced around the periphery of the hub in complementary prismatic bores. The second member includes two axially spaced apart outer hubs supported for coaxial rotation with respect to the inner hub and including complementary sinuate tracks for slidably engaging opposite axial ends of said sliders, the inner hub being mounted for relative rotation substantially within the outer hubs.

Preferably, the prismatic sliders are generally rectangular in cross section and reciprocate in said bores during relative movement between said hubs.

Preferably also, the inner hub includes a plurality of axially extending fluid control slots around the periphery of said inner hub alternately spaced between said bores for decreasing the resistance to oscillation provided by the hydraulic fluid medium.

According to a second aspect, the invention consists in a torque proportioning differential mechanism having inherent torque bias, said differential mechanism including a carrier adapted to be rotatably driven about a longitudinal axis, a pair of coaxial parallel side gears supported for rotation about an axis fixed with respect to the carrier, at least one pinion rotatably mounted to said carrier and in meshing engagement with said side gears, and a coupling assembly substantially as herein described disposed effectively between said side gears or between one of said side gears and said carrier such that a difference in angular velocity between said side gears causes a corresponding difference in angular velocity across the coupling, thereby creating drag which enables unequal torque to be supported at each side gear.

Preferred embodiments of the invention will now be described, by way of example only, with reference to the accompanying drawings in which:

MODES FOR CARRYING OUT THE INVENTION

Figure 1:
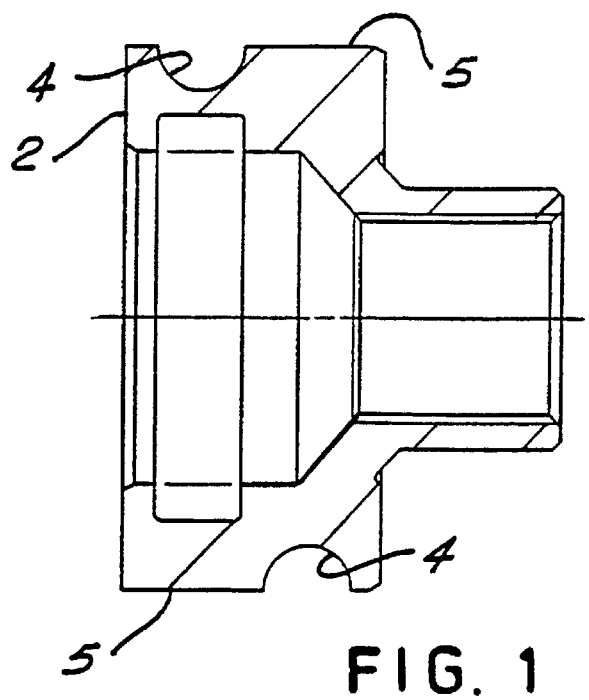
FIG. 1 is a sectional side elevation showing the inner hub of a hydraulic ball coupling according to the invention.
Figure 2:
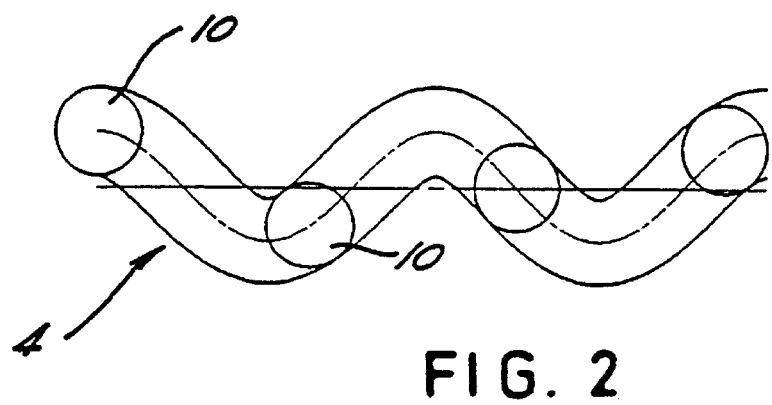
FIG. 2 is a projected plan view showing the sinusoidal track extending circumferentially around the hub of FIG. 1.
Figure 3:
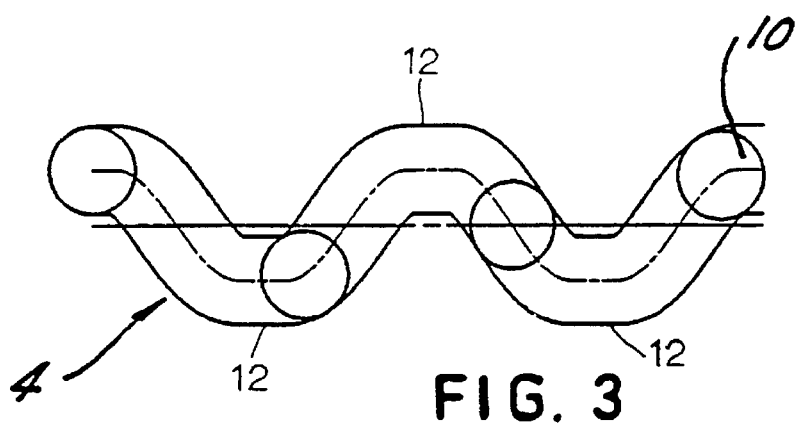
FIG. 3 is a projected plan view showing an alternative embodiment of the track of FIG. 2.
Figure 5:
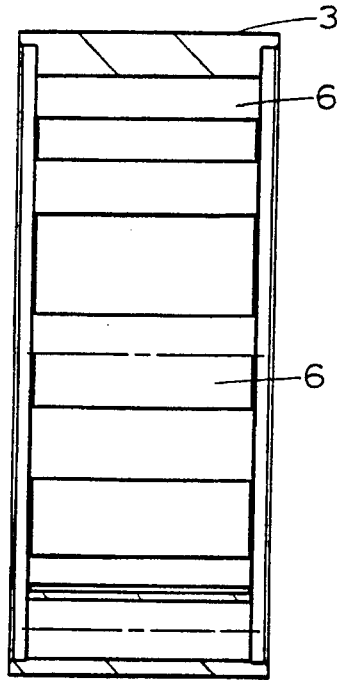
FIG. 5 is sectional view taken along line 5—5 of FIG. 4.
Figure 4:
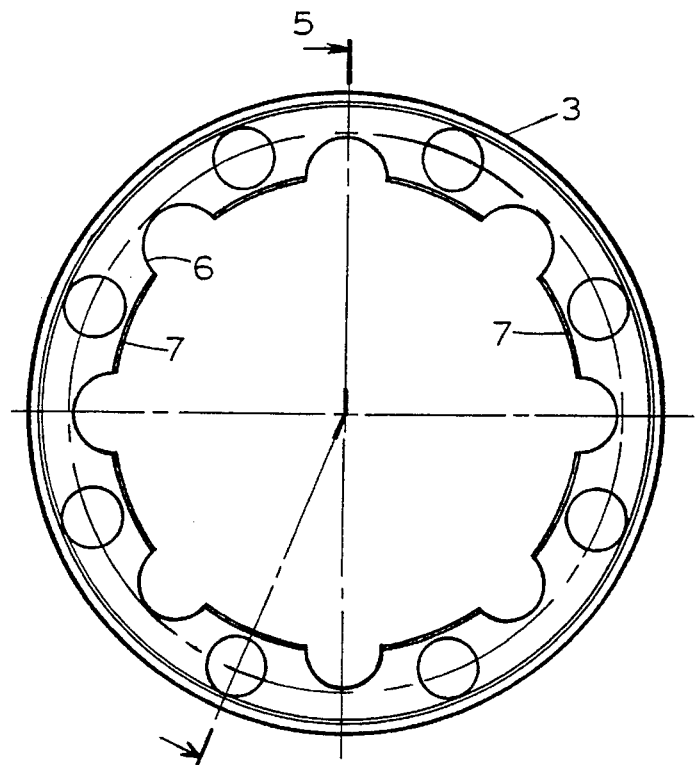
FIG. 4 is a sectional end elevation showing the outer hub of a hydraulic ball coupling according to the invention.
Figure 7:
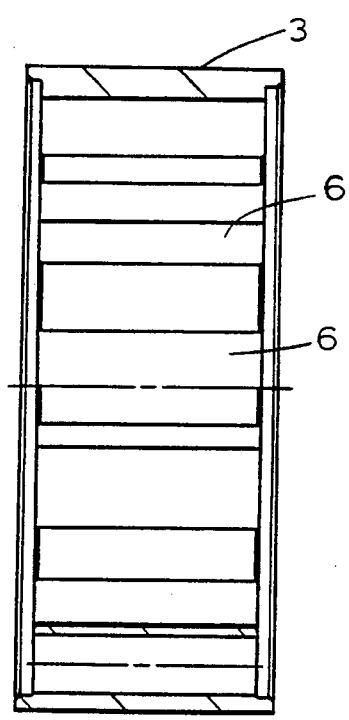
FIG. 7 is a sectional view taken along line 7—7 of FIG. 6.
Figure 6:
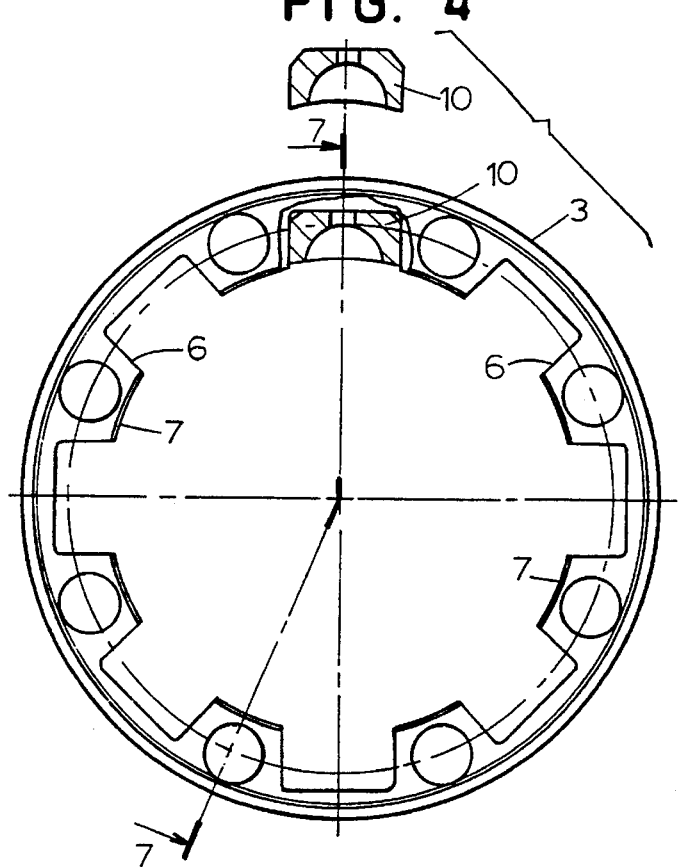
FIG. 6 is a sectional end elevation showing an alternative embodiment of the outer hub of FIG. 4 wherein the ball supports a rectangular prismatic slider.

Referring to FIGS. 1 to 12 of the drawings, wherein corresponding features are denoted by corresponding reference numerals, a hydraulic ball coupling assembly 1 comprises an inner hub 2 and an outer hub 3 disposed for relative coaxial rotational engagement. The inner hub 2 includes a continuous sinuate recessed track 4 extending circumferentially around the cylindrical outer surface 5. The outer hub 3 includes a plurality of uniformly spaced axially extending grooves 6 on the inner cylindrical surface 7. The grooves 6 extend in a direction substantially normal to the general effective direction of the sinuate track 4.

A slider 10 is reciprocably disposed within each groove 6 and located in the intersecting region 11 of the sinuate track 4 and the respective groove such that relative rotation of the inner and outer hubs causes each slider 10 to oscillate axially within its respective groove 6 while traversing the track 4.

The grooves 6 and track 4 contain a hydraulic fluid of suitable viscosity to provide fluid resistance to the oscillation of the sliders and thereby permit transmission of torque between the driving and driven hubs.

The coupling preferably incorporates suitable sealing means intermediate the inner and outer hubs to contain the hydraulic fluid within the grooves and track. Alternatively however, in some applications the coupling may be adapted to operate in a fluid bath in which case sealing means may not be required.

In a torque transmission element, the inner and outer hubs are drivingly connected with respective input and output rotary drive shafts. Any difference in angular velocity between the driving and driven hubs causes the sliders 10 to traverse the sinuate track 4 which causes a corresponding reciprocating movement of the sliders within their respective grooves 6. This reciprocating movement is resisted by the hydraulic fluid medium to enable torque to be transmitted between the hubs.

The track 4 is preferably sinusoidal to provide smooth transmission of torque. However, it will be appreciated that any suitable form of sinuate track could be used such as that illustrated in FIG. 3 which shows a modified sinusoidal form having dwell regions 12 at the positions of maximum amplitude.

Figure 8:
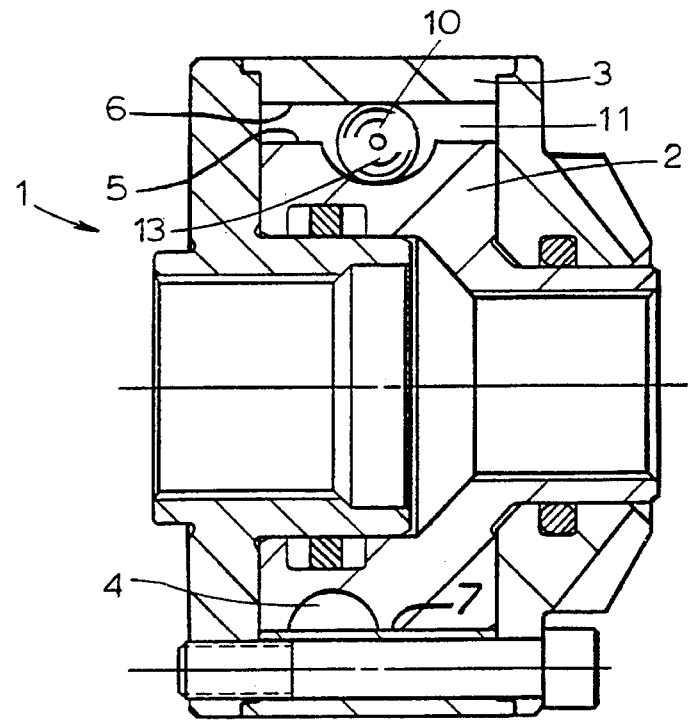
FIG. 8 is a sectional side elevation showing a hydraulic ball coupling assembly incorporating a ball slider according to the invention.

In one form of the invention, as shown in FIG. 8, each slider 10 is in the form of a steel ball 13 and the track 4 and grooves 6 are semi-oval shaped in cross section to contain the balls within the intersecting regions 11 of the track and grooves. A peripheral clearance is provided through which the hydraulic fluid is throttled during reciprocation of the slider.

In this configuration, the reciprocating movement of the balls 13 causes viscous shearing of the fluid medium within the grooves to produce frictional drag which resists movement of the balls and thereby enables torque to be transferred between the driving and driven hubs. Accordingly, a high viscosity fluid such as a silicon based liquid or grease is preferred to provide the requisite resistance to motion.

Figure 9:
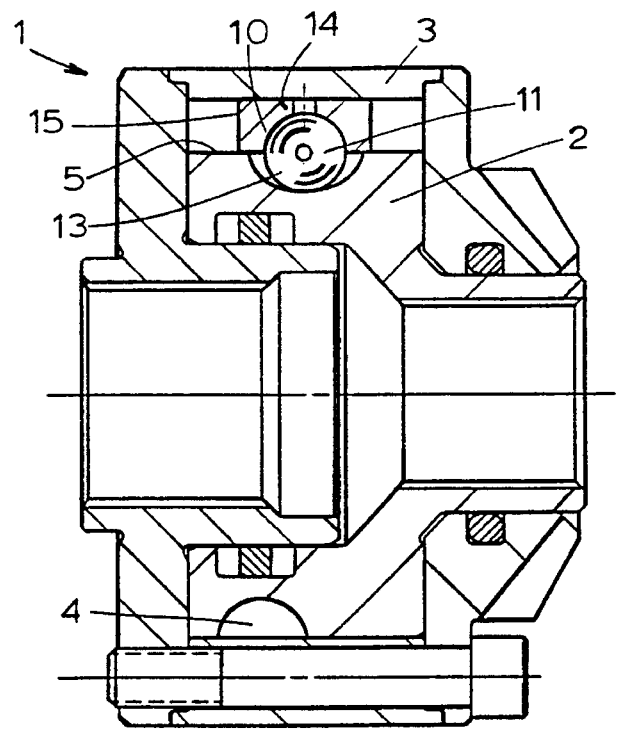
FIG. 9 is a sectional side elevation showing an alternative embodiment of the coupling assembly of FIG. 8 wherein the ball supports a rectangular prismatic slider.

Referring to FIG. 9 showing an alternative form of the invention, the slider 10 comprises a ball 13 in driving engagement with a rectangular prismatic sliding block 14 adapted for reciprocation within a complementary prismatic groove. The longitudinally extending edges 15 of the sliding block 14 are chamfered to define clearance passages through which the hydraulic fluid is throttled as the ball 13 traverses the sinusoidal track.

In another form of the invention (not shown) the ball 13 engages a piston sealingly slidable within a complementary groove or bore and the piston includes an orifice through which the hydraulic fluid is throttled to provide a predetermined resistive damping force. It will be appreciated that this form of the invention incorporating the orifice provides a more controlled flow and therefore more consistent torque transfer characteristics. Furthermore, this form of the invention permits discrete adjustment of the torque-speed characteristic of the coupling by the substitution of different sized orifices thereby enabling the coupling performance characteristics to be tailored to suit particular applications.

For these configurations incorporating prismatic or piston sliders, the hydraulic fluid contained on either side of the sliders generates a high resultant pressure differential resisting reciprocating slider motion, relative to the ball slider configuration of FIG. 8. Consequently, a relatively low viscosity hydraulic fluid is preferred to achieve the desired torque-speed characteristic and to avoid loss of torque at higher speeds due to cavitation.

Figure 10:
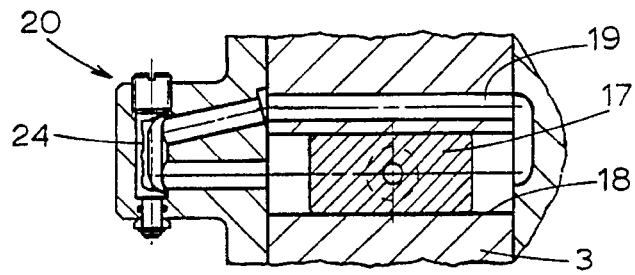
FIG. 10 is a cutaway sectional plan view showing a control valve in a closed hydraulic circuit associated with one of the sliders of a hydraulic ball coupling according to the invention.
Figure 11:
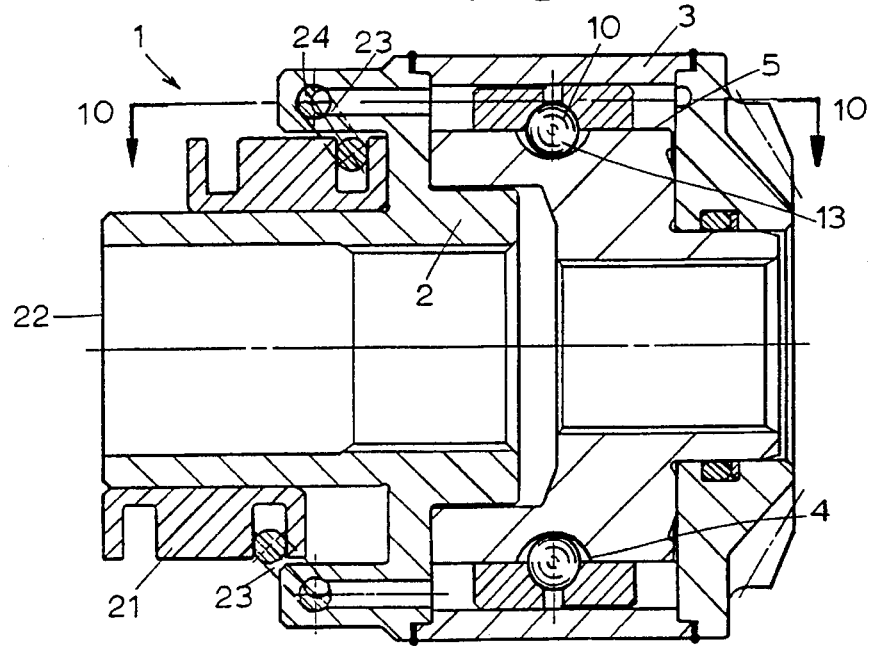
FIG. 11 is a partly sectioned side elevation showing a hydraulic ball coupling incorporating the control valve of FIG. 10.
Figure 12:
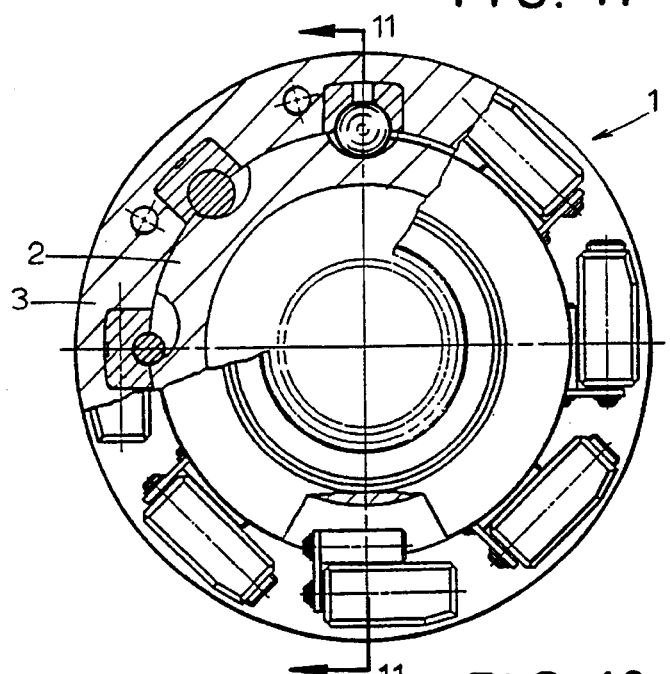
FIG. 12 is a cutaway end elevation of the hydraulic ball coupling of FIG. 11.

FIGS. 10 to 12 show a further form of the invention wherein the ball 13 drivingly engages a cylindrical piston 17 sealingly slidable within a complementary bore 18. The hydraulic fluid is contained within a closed hydraulic circuit 19 and throttled through a selectively adjustable control valve 20. The torque transfer characteristics of the coupling for given differential velocities can thus be varied by adjustment of the control valve 20 by means of adjusting sleeve 21 on shaft 22. The adjusting sleeve 21 includes spaced apart flanges which engage control valve actuating levers 23 connected with rotary control valve barrels 24 such that axial movement of the adjusting sleeve 21 effects a corresponding simultaneous rotation of the valve barrels 24 between the open and closed positions.

A complete lock-up condition between the input and output hubs can be achieved by closure of the control valves 24 as shown in the bottom half of FIG. 11. It will be apparent that the adjustment of the control valve to vary the torque-speed characteristic of the coupling right through to the lock-up condition can be effected by a suitable microprocessor or other electronic, hydraulic or mechanical control system whereby the coupling can be used adaptively to achieve a predetermined system response. This form of the invention is particularly suitable for use in automotive applications to provide the desired torque bias characteristics in a limited slip differential, or to provide the required level of vibration absorption in a transmission coupling or controlled slip clutch.

Figure 14B:
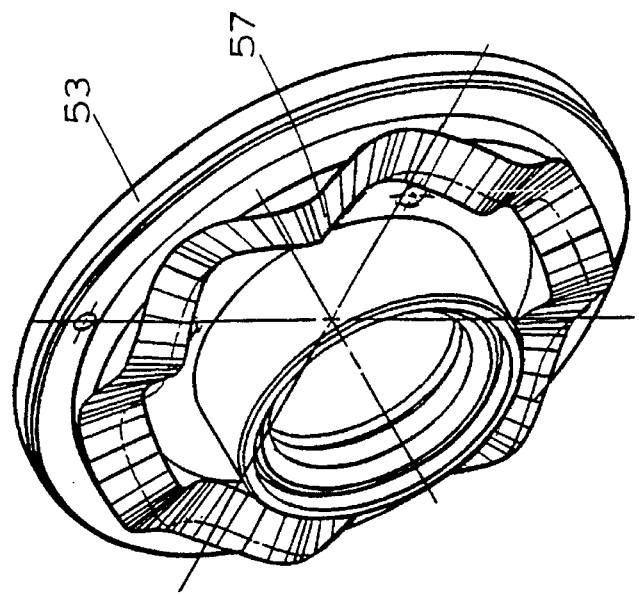
FIGS. 14A and 14B are exploded perspective views of first and second outer hubs, respectively, for use with the inner hub of FIG. 13.
Figure 13:
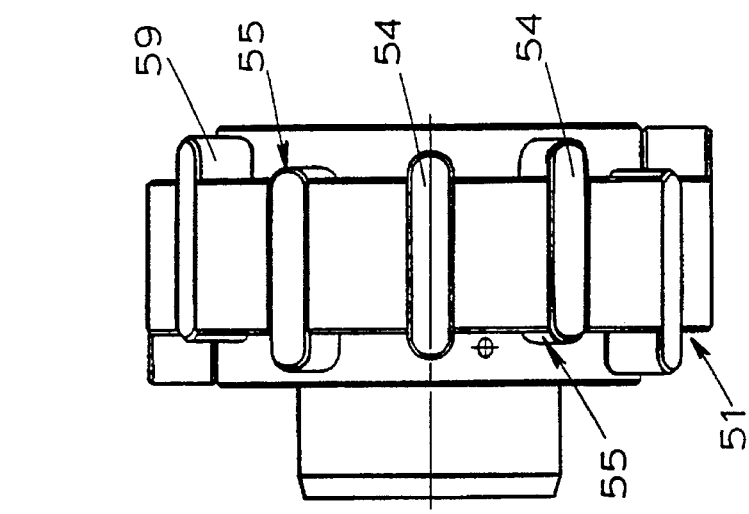
FIG. 13 is a side view of an inner hub of a hydraulic slider coupling.
Figure 14A:
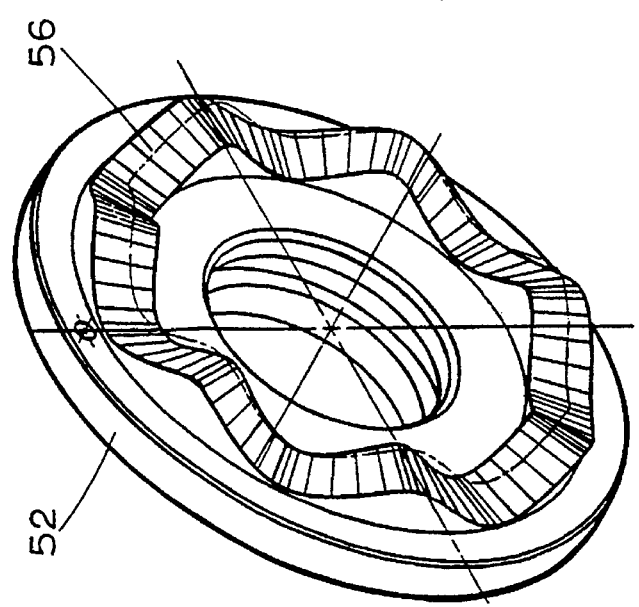
Figure 15:
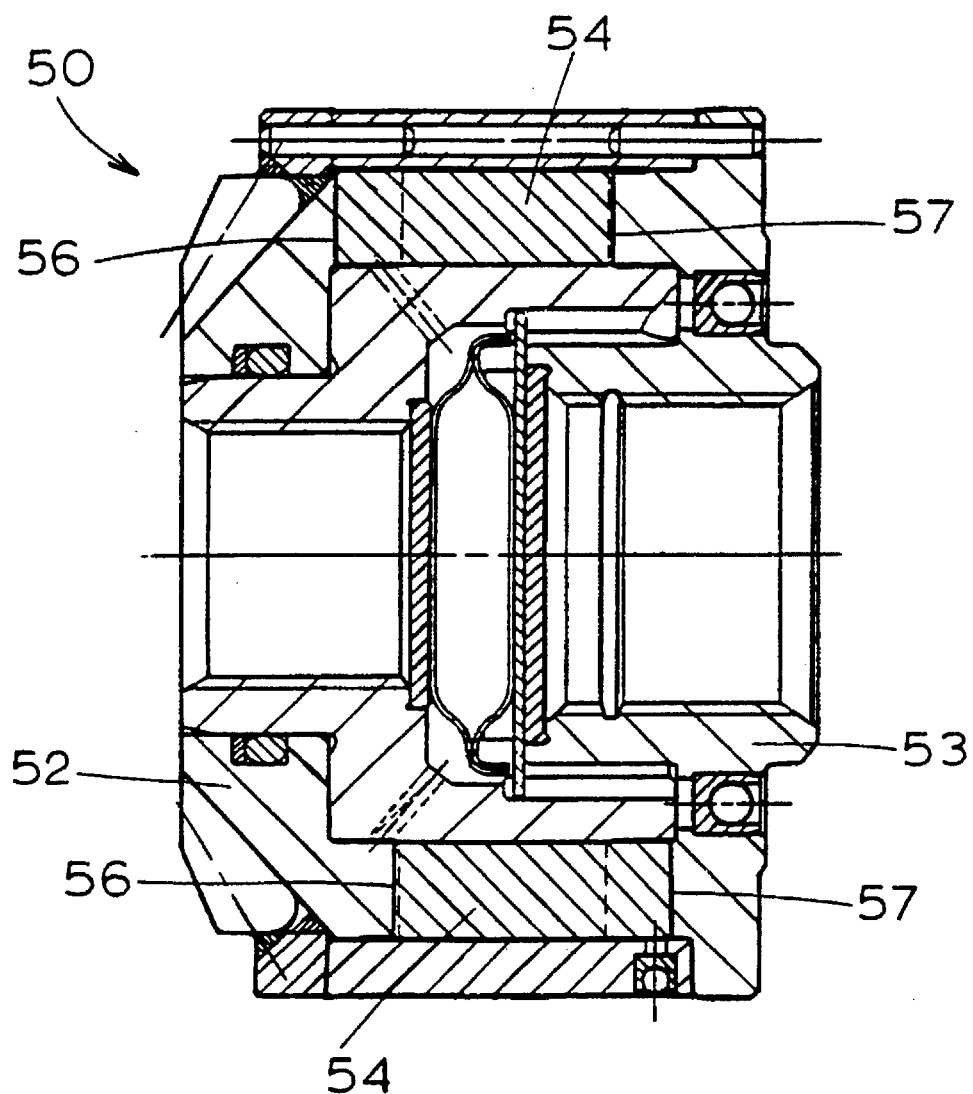
FIG. 15 is a sectional side elevation showing a hydraulic slider coupling incorporating the hubs of FIGS. 13, and 14A and 14B.

Referring to FIGS. 13 to 15, a hydraulic slider assembly 50 includes an inner hub 51 and two outer hubs 52 and 53 disposed for relative coaxial rotational engagement. The inner hub 51 includes a plurality of axially extending rectangular sliders 54. Sliders 54 are equally angularly spaced around the periphery of the hub 51 in complementary bores 55.

Outer hubs 52 and 53 are independently rotatable and axially opposed about hub 51 and include complementary sinuate tracks 56 and 57 respectively. The tracks are continuous and slidably engage respective opposite axial ends of the sliders 54.

Sliders 54 are square in cross section and oscillate axially in the bores during relative movement of the inner and outer hubs. The hydraulic fluid maintained between the hubs provides fluid resistance to the movement of the sliders and allows torque to be transferred between the hubs.

In alternative embodiments the inner hub 51 includes a plurality of axially extending fluid control slots (not shown) alternately spaced between the bores 55 to decrease the fluid resistance. Alternatively, predetermined clearances are provided either between the sliders 54 and respective bores or the sliders 54 and the tracks 56 and 57 or both.

Turning now to describe the application of the coupling as a variable torque transfer element in a limited slip differential, when a vehicle is cornering the outside wheel rotates with higher angular velocity than the inside wheel. The conventional differential mechanism accommodates this difference in angular velocity while, in the case of a differential having 100% efficiency, transmitting equal torque to both driving wheels at all times.

However, if one driving wheel loses traction, for example on a slippery surface, this wheel will spin freely and support little or no torque. Therefore the conventional differential mechanism will transmit little or no driving torque to the wheel with traction and the vehicle will remain motionless.

One solution to this problem is to provide a torque proportioning or "limited slip" differential whereby torque is biased or transferred to the wheel with the most traction to control loss of drive.

Known torque proportioning differentials usually employ preloading springs and frictional clutches as a means of increasing the torque bias. However, these designs have limited operational life due to excessive clutch wear which occurs whenever there is differential motion as a result of the inherent frictional preload applied to the clutches. Furthermore, the inherent friction in the clutches resists relative wheel rotation during normal turning manoeuvres thereby adversely affecting vehicle handling under normal driving conditions and giving rise to a further problem of increased tire wear. These problems are particularly significant in front wheel drive vehicular applications.

Figure 16:
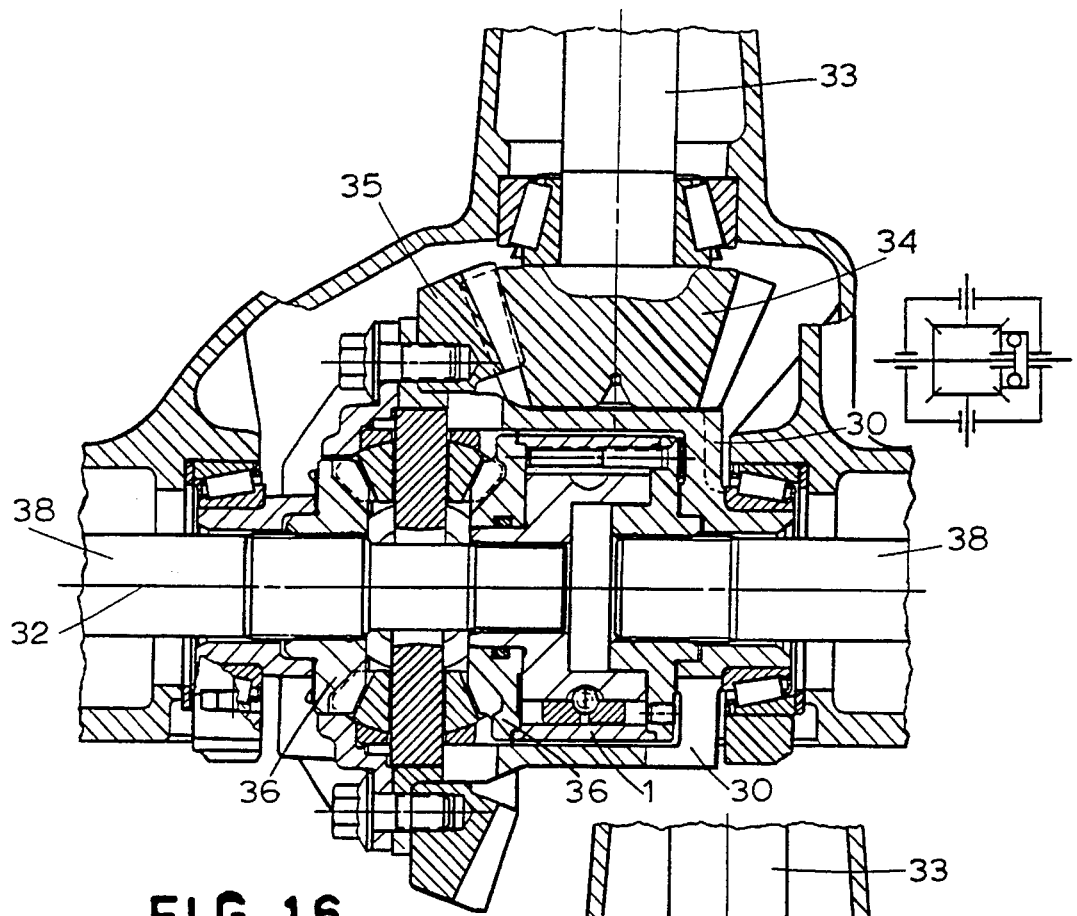
FIG. 16 is a sectional view showing a hydraulic ball coupling assembly disposed between the half-shafts in a limited slip differential.
Figure 17:
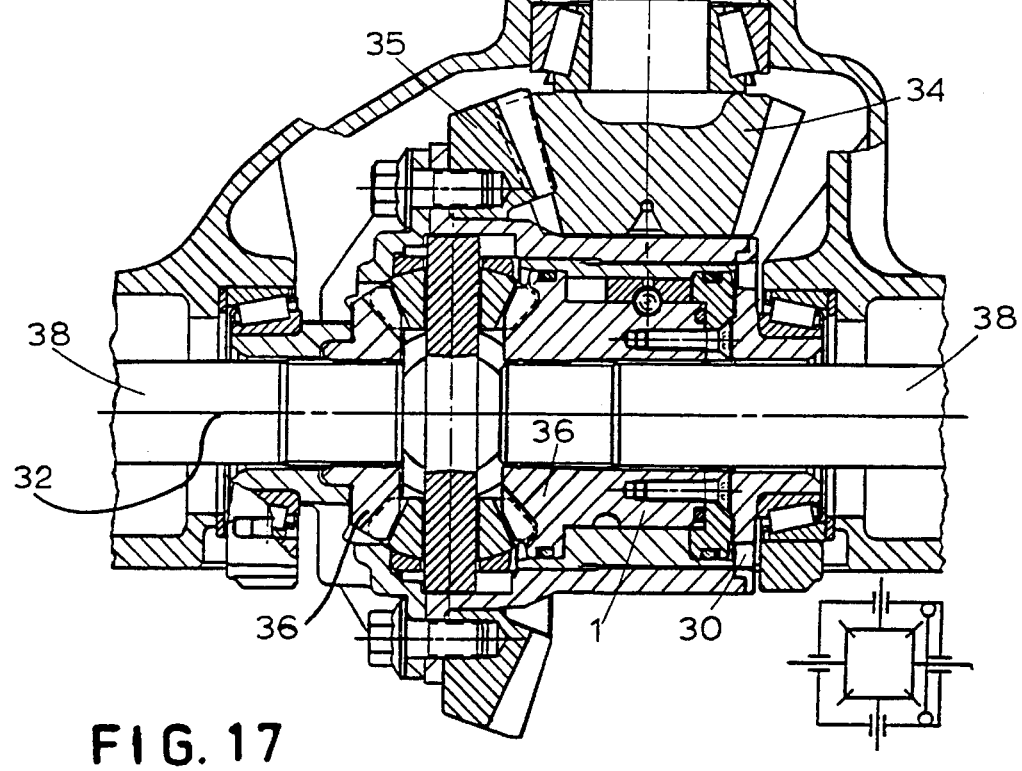
FIG. 17 is a sectional view similar to FIG. 16 showing a hydraulic ball coupling disposed between one of the half shafts and the carrier in a limited slip differential.

Referring to FIGS. 16 and 17 of the drawings, the differential carrier 30 is driven about an axis 32 by means of an input drive shaft 33. The drive from input shaft 33 is subsequently diverted through 90° by a bevel pinion 34 in meshing engagement with a complementary bevel crown wheel 35 fixed with respect to the carrier 30. The side gears 36 are respectively connected with a pair of coaxial mutually opposed outwardly depending half shafts 38 which in turn are connected to the driving wheels of the vehicle (not shown).

FIG. 16 shows a first torque proportioning differential configuration wherein the hydraulic ball coupling 1 is effectively disposed intermediate the axle half-shafts 38. In this configuration, the torque difference between the left and right hand shafts is approximately equal to twice the coupling torque and the angular velocity difference across the coupling corresponds to the wheel speed difference.

FIG. 17 shows a second torque proportioning differential configuration wherein the coupling is positioned effectively between one of the axle shafts 38 and the differential carrier 30. In this configuration, the torque difference between the left and right hand half-shafts corresponds to the coupling torque and the angular velocity difference across the coupling is equal to half the wheel speed difference.

In both cases, the coupling is connected in the driveline in parallel with the differential. However, the coupling can also be connected in series with the driveline as discussed later and used as a transmission element.

Under normal driving conditions both wheels and hence both side gears rotate with approximately equal angular velocity and support approximately equal torque. However, if one wheel loses traction the resultant velocity difference across the fluid coupling in the differential gives rise to a resistance as the reciprocating sliders displace the fluid within their respective grooves while traversing the sinuate track. The fluid resistance to movement of the sliders provides a locking torque which impedes differential rotation of the side gears and enables unequal torques to be transmitted to the driving wheels.

A principal advantage of the hydraulic slider coupling in a torque proportioning or limited slip differential is that the system is responsive to speed as opposed to the conventional torque responsive limited slip differentials. Thus the system provides low differential locking torque during cornering under normal driving conditions so as not to adversely affect vehicle handling and provides a gradual and progressive increase in resistive torque with increasing speed difference during conditions of wheel slip. In addition to proving torque bias to increase traction, the hydraulic ball coupling partially absorbs transient shock loads applied to the driveline.

Taking into account the degressive torque transfer characteristic of the coupling, the "shaft-to-shaft" configuration produces approximately three times the locking torque of the "shaft-to-carrier" design for a given wheel speed difference. Consequently, the shaft-to-shaft design may be preferred in applications requiring high torques. On the other hand, in front wheel drive vehicular applications low torque bias may be preferred so as not to adversely affect vehicle handling, or cause excessive tire wear and in this case the shaft-to-carrier design may be preferable.

In either case, the torque transfer characteristics of the coupling can be tailored to suit particular applications by the variation of a number of parameters including:
1. The viscosity of the fluid medium;
2. The number, size and shape of the sliders and their respective grooves;
3. The shape of the sinuate track;
4. The number of sinuate waves;
5. The throttling clearance between the sliders and their respective grooves (or in the embodiment employing a control valve in series with a hydraulic circuit, the adjustment of the control valve);
6. The shape and configuration of the hubs.

The differential incorporating the hydraulic slider coupling according to the invention is also particularly effective in center differential applications or as a torque transmission element in the drivelines of multiple wheel drive vehicles.

Figure 18:
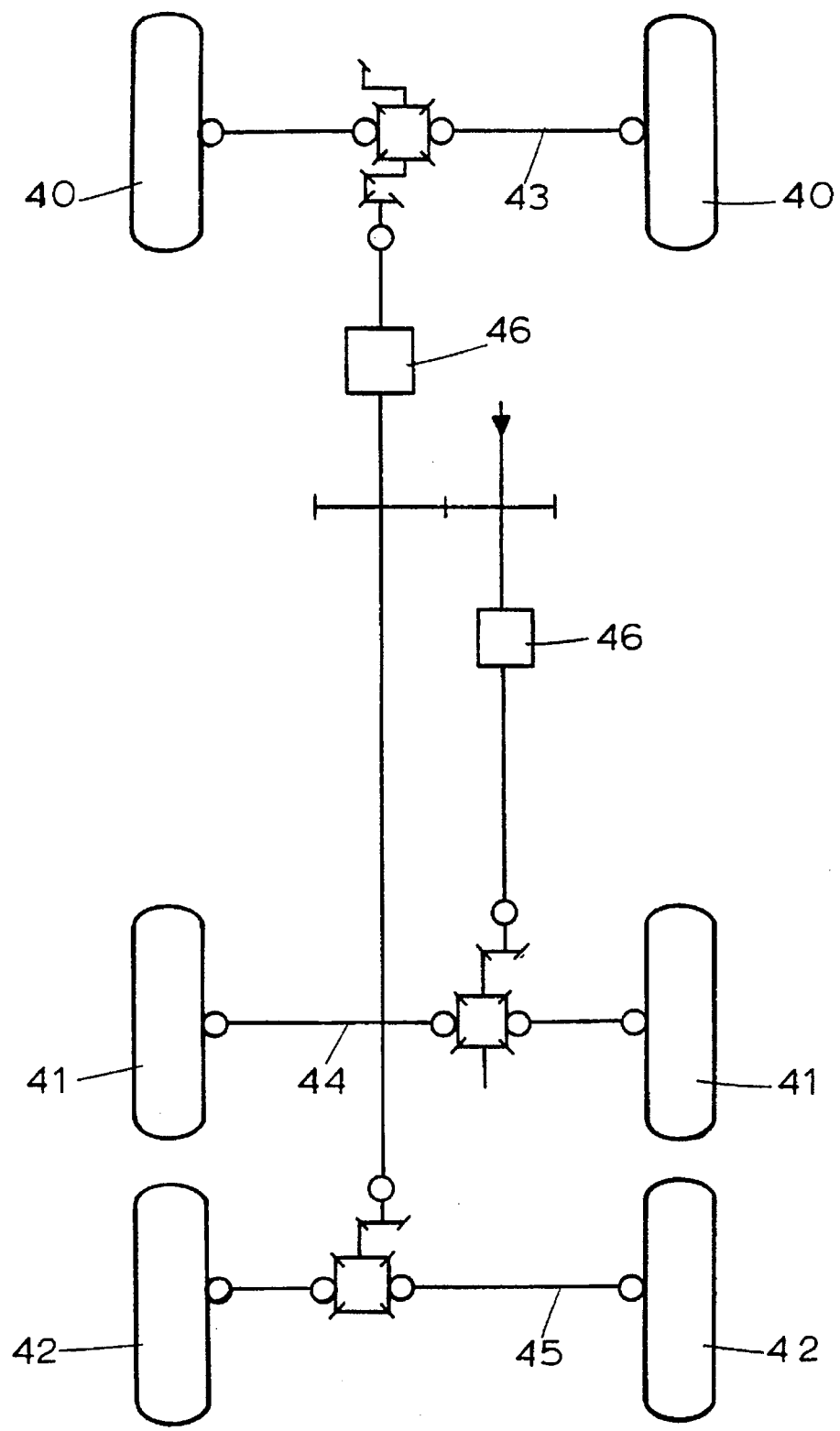
FIG. 18 is a diagrammatic plan view showing a hydraulic slider coupling as a transmission element in the driveline of a multiple wheel drive vehicle.

Referring now to FIG. 18, when a vehicle is cornering the average speed of the front wheels 40 is higher than the average speed of the rear wheels 41 and 42 and therefore the transmission of power to the wheels in multiple wheel drive vehicles necessitates a degree of relative independence between the driven axles 43, 44 and 45. This problem is usually overcome by the use of a center differential disposed between the driven axles. However, if one wheel loses traction and spins all the power is lost through this wheel which is no longer able to transmit torque.

This problem can be substantially ameliorated by the substitution of a hydraulic ball coupling 46 as a torque transmission element in place of each inter-axle differential. The coupling 46 permits the requisite relative motion between the driven axles under normal driving conditions, while transferring or biasing torque from the spinning wheel to the interconnected axle under conditions of wheel slip.

It will be appreciated that the hydraulic slider coupling of this invention provides a number of advantages. The coupling is compact in relation to known viscous couplings and is readily adapted for incorporation into a differential to provide smooth and progressive speed responsive torque transfer under conditions of wheel spin. In particular, the selectively variable torque transfer version incorporating the control valve provides a range of torque transmission characteristics up to full lock-up for a given speed difference, making the coupling particularly suitable for use in a differential to provide selective lock-up under adverse conditions of low traction to control wheel spin. This form of the invention is equally applicable as a center differential in multiple wheel drive vehicles.

Furthermore, the sliders and respective grooves share equally in the simultaneous generation of resistive torque so that the load on the individual sliders and the corresponding contact stresses on the track are relatively small as opposed to a system incorporating intermeshing gear teeth wherein only one to three teeth are in contact at any given time so that the resultant contact stresses are relatively high.

Moreover, it can be demonstrated that the sum of the torques generated from a number of equally spaced sliders is substantially constant with no significant torque pulsations, despite the periodic variations in torque from each individual slider in relation to the position of each slider on the track.

However, it will be apparent that the invention is not limited to automotive applications but can be used to advantage in a variety of applications such as vibration absorbing elements, clutches, torque converters and the like.

Although the invention has been described with reference to specific examples, it will be appreciated by those skilled in the art that the invention may be embodied in many other forms. For example the track could be disposed on the outer hub and the grooves on the inner hub. In addition the engaging surfaces of the hubs need not be cylindrical but could be conical, circular or annular or stepped for example.

We claim:

1. A coupling assembly comprising a first member and a second member disposed for relative rotational engagement, one of said first and said second members including a peripherally extending continuous and generally sinuate track, the other of said first and said second members including a plurality of transverse tracks extending in a direction substantially normal to the general direction of the sinuate track, a corresponding plurality of sliders located respectively in intersecting regions of said sinuate and transverse tracks, a viscous hydraulic fluid medium disposed within said sinuate and transverse tracks, and peripheral throttling clearances defined respectively between said transverse tracks and said sliders, such that relative rotation of said first and said second members causes said sliders to oscillate axially within said transverse tracks while traversing said sinuate track and simultaneously causes an alternating axial transfer of said viscous hydraulic fluid medium past said sliders through said throttling clearances, whereby the resultant resistance to said fluid transfer enables transmission of torque between said first and said second members.

2. A coupling assembly according to claim 1 wherein said first member is an inner hub including said sinuate track on an outer cylindrical surface thereof and wherein said second member is a complementary outer hub defining said plurality of said transverse tracks in the form of uniformly spaced axially extending grooves or bores on an inner cylindrical surface thereof, said inner and outer hubs being mounted for relative coaxial rotation.

3. A coupling assembly according to claim 2 wherein said sinuate track is periodic.

4. A coupling assembly according to claim 3 wherein said sinuate track is sinusoidal.

5. A coupling assembly according to claim 1 wherein said slider is in the form of a ball end the sinuate and transverse tracks are substantially semi-circular in cross section.

6. A coupling assembly according to claim 1 wherein said slider is in the form of a ball engaging a prismatic slider disposed for reciprocation within said transverse track, said transverse track being defined by a complementary prismatic groove or bore.

7. A coupling assembly according to claim 6 wherein said transverse track is rectangular in cross section.

8. A coupling assembly according to claim 2 wherein a clearance is provided between said transverse track and said slider through which said hydraulic fluid is throttled during reciprocation of said slider.

9. A coupling assembly according to claim 2 wherein each said slider comprises a piston sealingly slidable within a respective one of said transverse tracks.

10. A coupling assembly according to claim 9 wherein said piston includes an orifice through which said hydraulic fluid is throttled.

11. A coupling assembly according to claim 10 wherein said hydraulic fluid is contained in a closed loop.

12. A coupling assembly according to claim 11 wherein said hydraulic fluid is throttled through a selectively adjustable control valve in response to reciprocation of said piston.

13. A coupling assembly according to claim 1 wherein said first member is an inner hub including a plurality of axially extending prismatic sliders angularly spaced around the periphery of the hub in complementary transverse tracks, the second member including two axially spaced apart outer hubs supported for coaxial rotation with respect to the inner hub and respectively including opposed complementary sinuate formations defining said sinuate track for slidably engaging opposite axial ends of said sliders, the inner hub being mounted for relative rotation substantially within the outer hubs.

14. A coupling assembly according to claim 13 wherein said sliders are generally rectangular in cross section and reciprocate in said transverse tracks during relative movement between said hubs.

15. A coupling assembly according to claim 14 wherein said inner hub includes a plurality of axially extending fluid control slots alternately spaced between said transverse tracks around the periphery of said inner hub.

* * * * *